Patented Nov. 11, 1941

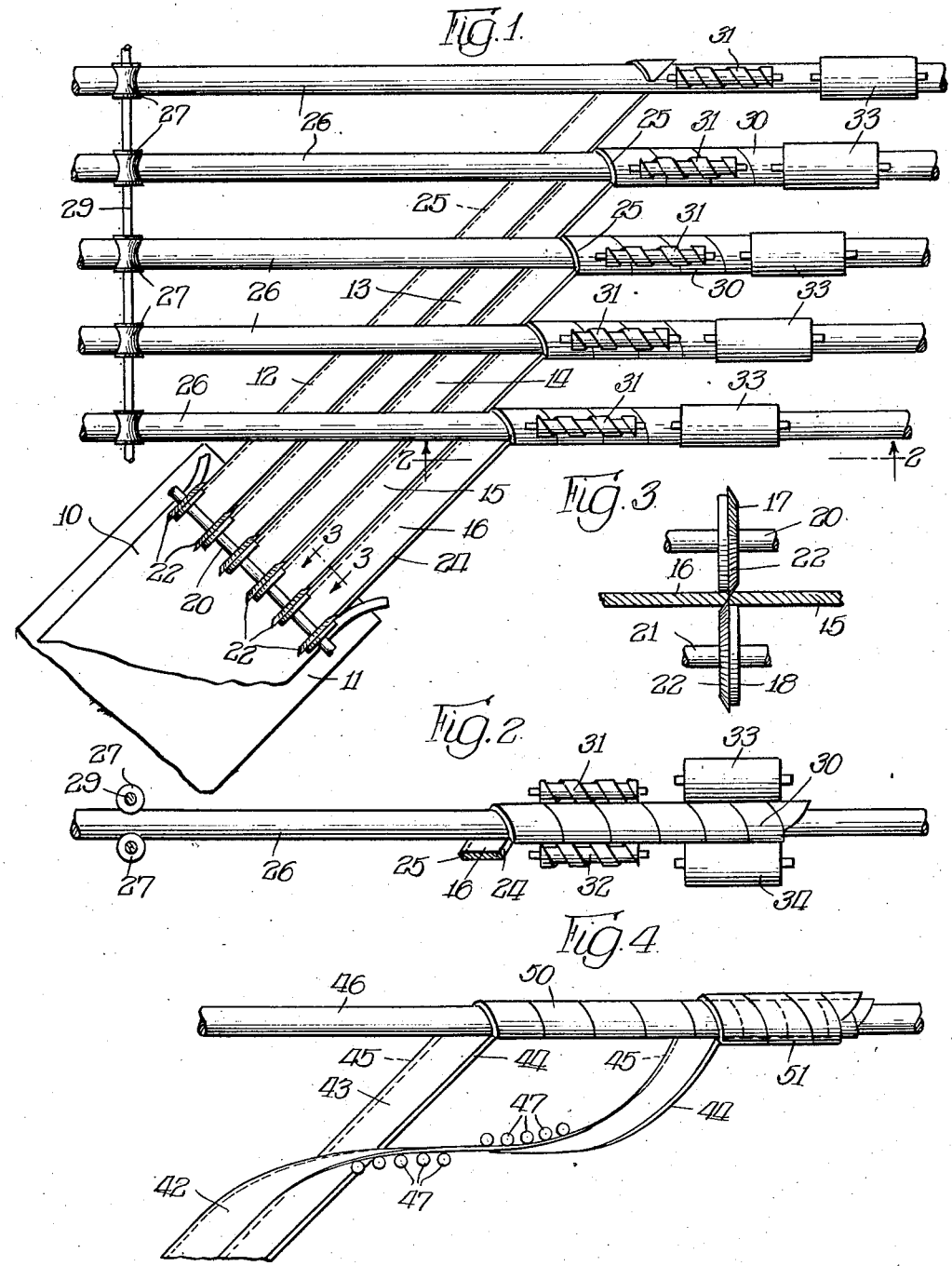

2,262,636

UNITED STATES PATENT OFFICE 2,262,636

METHOD OF AND MEANS FOR MAKING TUBULAR ARTICLES

Charles W. Cuno, Wilmington, Ill., assignor to The Lehon Company, Chicago, Ill., a corporation of Illinois Application July 14, 1939, Serial No. 284,447

6 Claims. (Cl. 25—30)

The invention relates to a method of and means for making spiral wound pipe and similar cylindrical objects and has reference more particularly to a method for their continuous and multiple manufacture from plastic material.

An object of the invention is to provide a new method of making tubular articles from plastic material such as a cement-asbestos mixture which may be continuous or intermittent, and whereby a plurality of said articles can be simultaneously produced from a web of said plastic material.

Another object resides in the provision of a method for making tubular articles and the like from plastic material wherein a web of said material will be simultaneously cut into strips and the edges of the strips bevelled or corrugated so that in the spiral winding of each strip on its mandrel the edges will coincide to form a lap which will securely bond the strips together.

Another object of the invention is to provide a method for making tubular articles wherein rollers are provided for contacting the exterior of each spiral wound article while on its mandrel to thereby help rotate and advance said mandrel and wherein said contacting rollers will also have a homogenizing and kneading action on the plastic material comprising the same.

Another object is to provide a method of making pipe, tubing and similar articles from plastic material wherein the articles will be cylindrical throughout their length and which will have well bonded lapping joints free from ridges or other obstructions.

Another object resides in the method of making tubular articles by winding superposed strips of plastic material on a mandrel in a manner whereby the lapping joints of the first strip are covered by the superposed strip and in kneading the exterior of the composite article to homogenize the material and remove all ridges and other irregularities from said exterior.

With these and various other objcts in view, the invention may consist of certain novel features of construction and operation as will be more fully described and particularly pointed out in the specification, drawing and claims appended hereto.

In the drawing which illustrates an embodiment of the device and wherein like reference characters are used to designate like parts—

Figure 1 is a plan view illustrating the improved features of the invention for manufacturing tubular articles from plastic material;

Figure 2 is an elevational view taken substantially along line 2—2 of Figure 1 showing one of the mandrels and the manner of coiling a strip of plastic material thereon;

Figure 3 is a sectional view taken substantially along line 3—3 of Figure 1 showing the means for cutting the web of plastic material into strips; and Figure 4 is a plan view illustrating a modification of the invention wherein superposed strips of plastic material are coiled on a mandrel.

The invention is concerned with the manufacture of pipe and similar tubular articles from plastic material such as a cement-asbestos mixture. Said mixture is made in the form of a relatively wide web which may be supplied in a continuous length or intermittently in lengths sufficient to produce pipe which may range from eight to ten feet in length. As shown in Figure 1, the web 10 of plastic material, which for illustrating the invention may be described as a cement-asbestos mixture, is suitably supported and fed by the table 11. Said table is provided with rotating cutters for severing the web to form a plurality of strips 12 to 16 inclusive, of substantially uniform width. The cutters 17 and 18 are located above and below the web, respectively, as better shown in Figure 3, and all the cutters disposed above are suitably fixed to and rotated by the transverse shaft 20, whereas, the lower cutters are fixed to and rotated by shaft 21.

In accordance with the invention the cutters are designed to cut the material and simultaneously bevel the edges of each strip. This is done to facilitate the coiling of each strip on its mandrel to produce lapping joints instead of butting joints, as would otherwise be the case. Accordingly, the cutting mechanism will bevel each strip so that the bevel on one edge is associated with the top surface and the bevel on the other edge is associated with the bottom surface. The shape of each strip in cross section will approximate a parallelogram. The bevelled wheels of the cutters may also have their surfaces fluted or corrugated, as indicated by numeral 22, so as to similarly corrugate the bevelled surfaces produced thereby. However, this latter structure is optional since the bevelling of each strip is entirely sufficient for producing lapping edges in the spiral winding of the strip so that the well bonded joints will result.

As shown in Figure 1, each strip has a top bevel on one edge indicated by numeral 24 and an under bevel on its other edge, indicated by numeral 25. A mandrel 26 is provided for each of the strips 12, 13, etc. and rollers 27, fixed to and rotated by shaft 28 are provided for causing forward travel of said mandrels as they are simultaneously rotated. The mechanism for rotating the mandrels may be of any conventional design such as shown in the patent to Frist et al. No. 479,264, patented July 19, 1892. In the coiling of the strips on their respective mandrels each strip passes under its mandrel and then around the same in a diagonal direction so that the joints which indicate the lapping edges of adjacent turns have a diagonal relation with respect to the axis of the mandrels. The under bevel 25 of each strip becomes a top bevel by the manner in which the strips are coiled on their mandrel and in the coiling operation this bevel 25 is brought into contact with the bevel 24 and since both have been cut on the same angle, it will be understood that the bevels coincide, thereby forming a lapping joint.

As the mandrels rotate each strip is coiled thereon as described and simultaneously with said rotation it is necessary to feed the mandrels forwardly at a speed which will vary in proportion to the speed of rotation of the mandrels. The forward direction of the same is toward the right, Figure 1, which brings the formed pipe 30 on each mandrel between upper and lower spiral rollers 31 and 32, respectively. Said rollers are suitably journalled and rotated by structure, not shown, and each roller on its periphery is provided with a relatively coarse flat spiral. The convolutions of the spiral have contact with the exterior of the article 30 and as a result of the rotation of the rollers the exterior surface of the article is kneaded so as to homogenize the material and simultaneously work the same over the lapping joints. Actually this working or kneading of the material removes the ridges and fills the depressions which may result from the lapping edges of the strip. Smooth surfaced rollers 33 and 34 are adapted to contact the exterior of each article for the purpose of finishing the surface thereof. Said rollers are located to the right of the flat spiral rollers and are likewise suitably supported and rotated by structure not shown. The effect of these rollers is to smooth the surface left somewhat uneven by the spiral rollers and to render the exterior of the article relatively uniform in diameter. Said smooth surfaced rollers have rotation in the same direction as the spiral rollers and which is the same as that of the mandrels 26. Accordingly, said rollers not only work the exterior surface of the article on the mandrel but also assist in the rotation of the mandrel on which the same is coiled.

In the modified form of the invention shown in Figure 4 the web of material is cut into strips and two of said strips are coiled on a mandrel in superposed relation. The strip 43, having bevelled edges, as previously described with respect to Figure 1, is coiled on the mandrel 46 to form the article 50. The adjacent strip 42 is guided by the vertically disposed rollers 47 and coiled in superposed relation on article 50 to form the composite article 51 wherein the lapping joints of the superposed strip will overlap those of the first strip. Also in each case the bevelled edges 44 and 45 will coincide to produce lapping joints. The article 51 may pass between spiral rollers for the purpose of kneading the material on the exterior thereof, and likewise smooth surfaced rollers may be provided for the purpose of smoothing the exterior and rendering the article substantially uniform in diameter as explained in connection with Figure 1. In the coiling of the superposed strips on the mandrel 46 it will also be understood that said mandrel is rotated and fed forwardly.

The web 10 of cement asbestos material is made by building up layers of the material on an accumulation roll which is cut transversely and removed from the roll when the desired thickness has been secured. Such a roll and the endless band from which layers of cement-asbestos material are picked up is shown in the patent of Arthur G. Leonard, Jr., No. 2,184,619 dated December 26, 1939. In removing the web from the accumulation roll the surface adjacent the roll becomes the top surface of the web, whereas, the last layer applied to the accumulation roll becomes the bottom surface. Said latter surface is therefore more workable than the top surface which by this time may have taken its initial set. Also the bottom surface will contain more water and is free of cracks and fissures which are found in the top surface as the result of the straightening out of the web. For these reasons the strips are coiled on their individual mandrel so that the bottom surface of the web becomes the exterior surface of the formed article. Said exterior surface, therefore, readily adapts itself to kneading and homogenizing which is accomplished by the flat spiral rollers and the smooth surfaced rollers. The bevelling of the edges so that a lapping joint is produced between adjacent convolutions in the coiling of the material on its mandrel is another important feature of the invention. The removal of the tubular pipe from its mandrel is facilitated by the smooth surfaced rollers 33 and 34 which tend to slightly loosen the pipe so that the same may be eventually cut in desired lengths and removed from the mandrel. Also it is possible to provide mandrels of sectional form wherein the various sections will fit together to form a substantially continuous mandrel for use in the continuous process of the invention but which may be separated later on and the pipe removed therefrom.

What is claimed is:

1. The continuous method of making tubular articles from a web of plastic cement-asbestos material, which comprises continuously moving a web of said material, cutting said moving web to form a plurality of strips of said material, bevelling the edges of each strip, forming each strip into a tubular article by coiling the same on a rotating mandrel which also has movement in an axial direction, whereby the bevelled edges of each strip overlap to form a lap joint, and in working the material exteriorly of each article while on its mandrel and prior to the initial set of the plastic material to homogenize and knead the material and to render the exterior surface relatively smooth and uniform in diameter.

2. The continuous method of making tubular articles from a web of cement-asbestos material in a plastic, moldable condition, which comprises cutting said web to form a plurality of continuous strips of said material, bevelling and simultaneously corrugating the edges of each strip, forming each strip into a tubular article by coiling the same on a rotating mandrel and which also has movement in an axial direction, whereby the bevelled and corrugated edges of each strip overlap to form a lap joint, and in working the material exteriorly of each article while on its mandrel and prior to the initial set of the plastic material to homogenize and knead the material and to render the exterior surface relatively smooth and uniform in diameter.

3. The method of making tubular articles from a moving web of plastic cement-asbestos material, which comprises cutting said moving web to form a plurality of strips of said material, bevelling the edges of each strip, forming a tubular article by coiling two adjacent strips on a rotating mandrel in superposed relation, said mandrel also having movement in an axial direction whereby the said bevelled edges of each strip overlap to form a lap joint, and in positioning the overlying strip with respect to the first strip on the mandrel so as to stagger the overlapping joints of the respective strips, and finally working the exterior of the composite article while on the mandrel and prior to the initial set of the plastic material to homogenize and knead the material and render the exterior surface thereof relatively smooth and uniform in diameter.

4. In a machine for forming tubing from a web of plastic material having a relatively short setting time, comprising means for cutting said web into a plurality of strips and simultaneously bevelling the edges of each strip, a mandrel for each strip on which the same is wound with the bevelled edges in overlapping relation to form a tubular article, means for rotating each mandrel and for propelling the same in a direction axially thereof, rollers having contact with the exterior of the formed tubular article while on its mandrel, certain of said rollers each having spiral convolutions formed thereon and the remaining rollers each having a smooth exterior, and means rotating the rollers whereby they knead and homogenize the material of the said tubular article.

5. The method of making tubular articles from a web of cement-asbestos material in a plastic, workable condition, which comprises continuously and bodily moving said web of material in one direction, cutting said moving web to form a plurality of strips of said material, forming each strip into a tubular article by spirally winding the same on an axially moving and rotating mandrel, producing bonded and secure joints on each spirally wound article by causing the edges to partly overlap during said coiling thereof, and in working the material exteriorly of each article while on its mandrel and prior to the initial set of the plastic material to homogenize and knead the material and render the exterior surface relatively smooth and uniform in diameter.

6. The method of making tubular articles from a web of cement-asbestos material in a plastic, workable condition, which comprises continuously and bodily moving said web of material in one direction, cutting said moving web to form a plurality of strips of said material, forming a tubular article by spirally winding two strips in superposed relation on an axially moving and rotating mandrel, positioning the overlying strip with respect to the first strip during spiral winding of the same on the mandrel so as to stagger the joints of the respective strips, and finally working the exterior of the composite article while on the mandrel and prior to the initial set of the plastic material to homogenize and knead the material and render the exterior surface thereof relatively smooth and uniform in diameter.

CHARLES W. CUNO.